Nov. 22, 1955     W. J. READING     2,724,485
DEVICE FOR DISCHARGING ARTICLES FROM A CONVEYOR
Filed Nov. 22, 1952     3 Sheets-Sheet 3
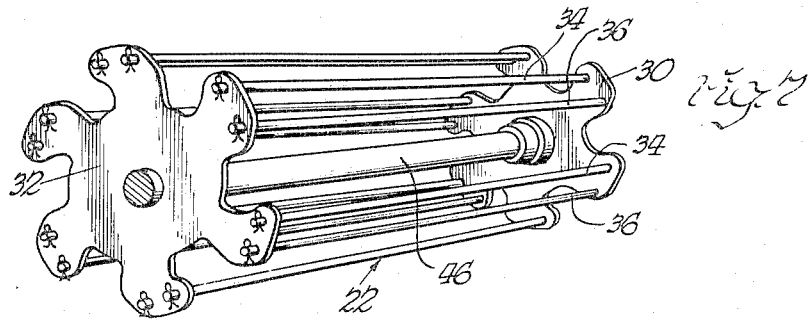
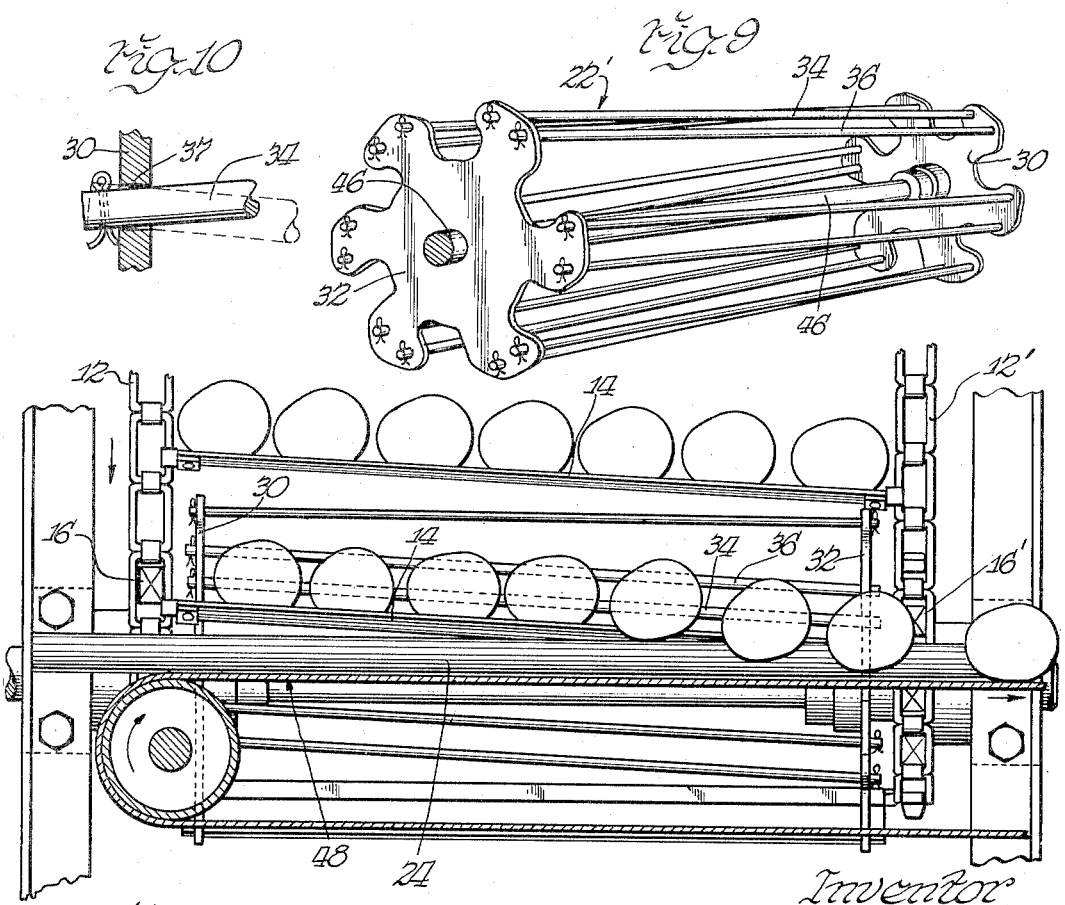
Inventor
Walter J. Reading
by Bair, Freeman & Molinare
Attys.

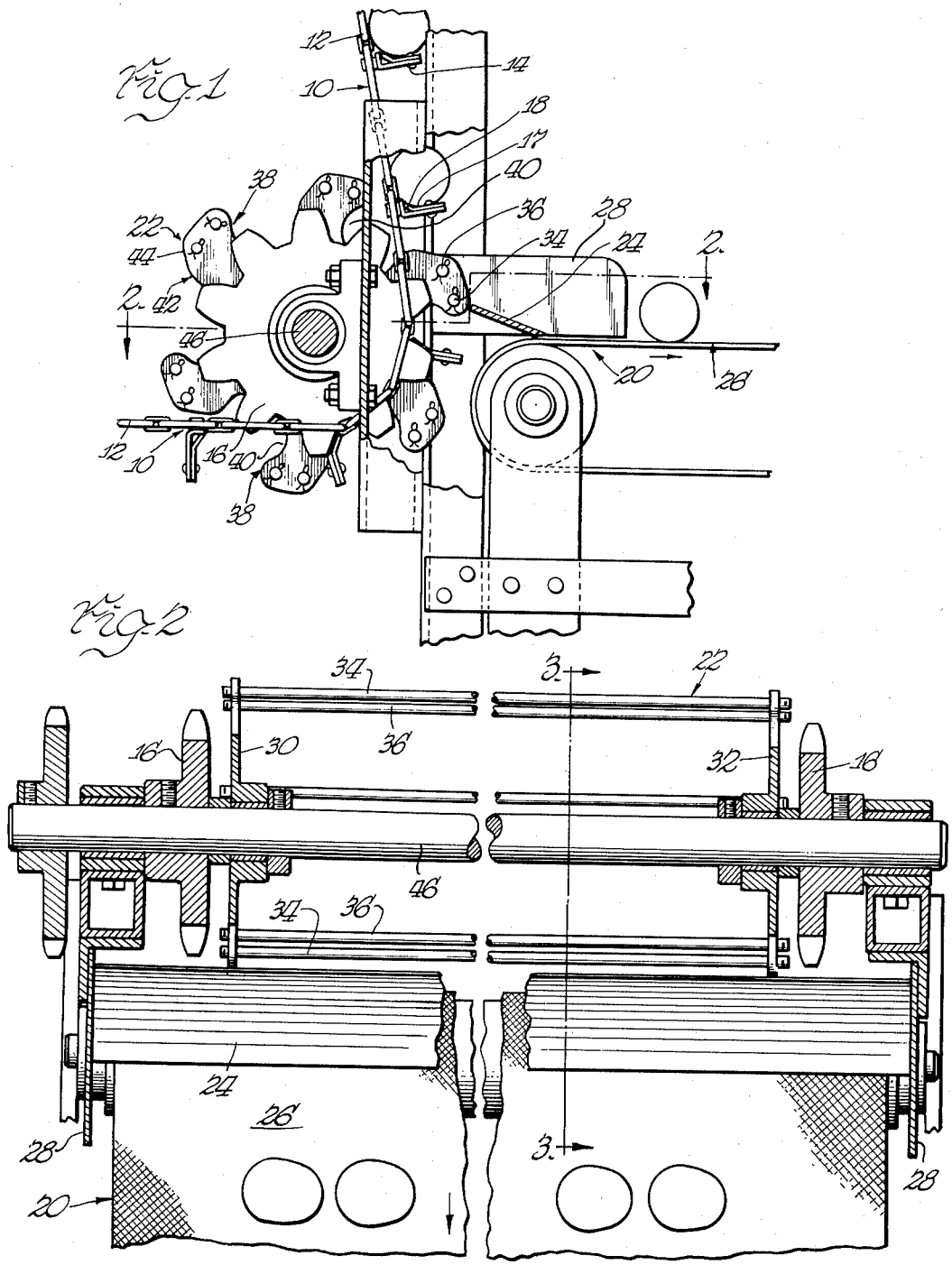

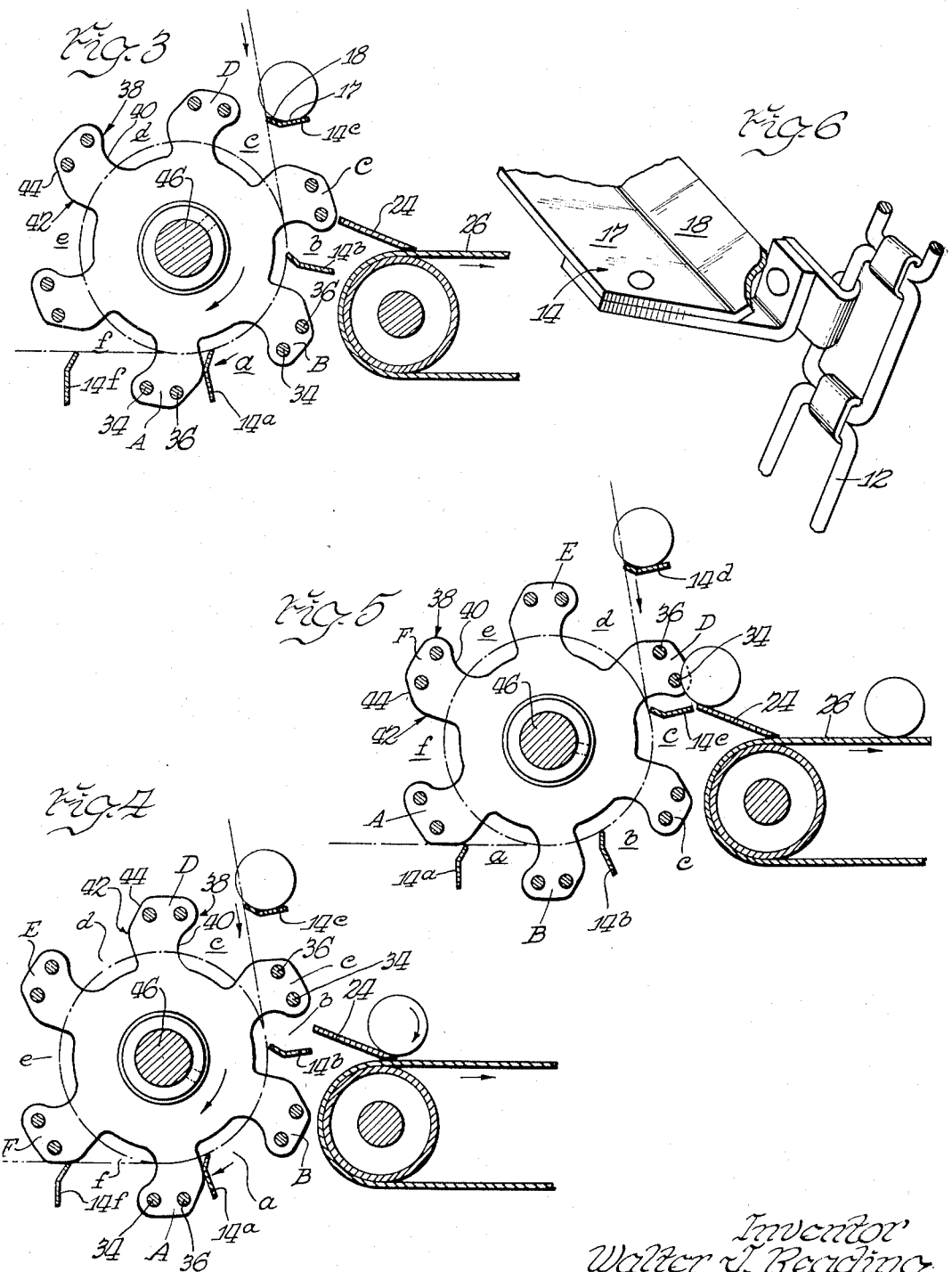

United States Patent Office 2,724,485
Patented Nov. 22, 1955

2,724,485

DEVICE FOR DISCHARGING ARTICLES FROM A CONVEYOR

Walter J. Reading, Ottumwa, Iowa

Application November 22, 1952, Serial No. 322,003

19 Claims. (Cl. 198—25)

This invention relates to a device for discharging articles from conveyors and more particularly to a device for discharging eggs from a conveyor composed of spaced flights.

In my copending application Serial Number 181,667, filed August 26, 1950, and now Patent No. 2,714,257, I have shown an ejector for discharging eggs or other articles from a conveyor composed of spaced flights. The ejector shown in my copending application rotated continuously and synchronously with the conveyor which was trained about the axis of rotation of the egg ejector. Said previous ejector had pivotable arms and cross-bars carried thereby which cooperated with the flights of the conveyor to eject the articles from the flights at a predetermined time. In using my previous ejector for ejecting eggs, where the egg was not fully ejected and tended to roll back into the conveyor, another cross-bar was pivoted forward sharply to engage the egg and prevent it from rolling back into the conveyor. This sharp forward movement of the second cross-bar to catch the egg trying to roll back into the conveyor is undesirable, as cracking or checking (light cracking of the eggshell) of the eggs occasionally resulted.

Now, when using my previous ejector with eggs, not all the eggs in a single row between conveyor flights are discharged simultaneously. The larger eggs are usually discharged easily but many smaller eggs tend to roll back into the conveyor. Since the conveyor is moving continuously, this means that the surface which receives the discharged eggs from the conveyor must be so placed that it receives the later discharged eggs as well as the earlier discharged eggs from a single flight. With such an arrangement, earlier discharged eggs fall a greater distance to the receiving surface and occasionally become cracked or checked.

Furthermore, the use of pivotable members in my previous ejector limited the closeness that the ejecting bars could come to the flight which supports the eggs being ejected.

Thus one of the objects of this invention is to provide an ejector useful in discharging eggs from a conveyor wherein there are no pivotable cross-bars which sharply engage the eggs, whereby checking of eggs is substantially eliminated.

Another object of this invention is to provide an ejector for use with a multi-flight conveyor wherein all articles carried by a conveyor flight are ejected from said flight at substantially the same height above the surface which receives the ejected articles.

A further object of this invention is to provide an egg ejector of improved and simplified design which eliminates pivotable arms and cross-rods which are designed to cooperate with the flights of the conveyor to achieve said discharge, said improved ejector design permitting movement of the ejecting member very closely adjacent the egg supporting flight and across substantially the entire width thereof, whereby positive discharge of the eggs is obtained and rolling back of the eggs into the conveyor is substantially eliminated.

Another object of this invention is to provide a novel ejector for use with a multi-flight conveyor, which ejector is characterized in the fact that it moves intermittently as the conveyor moves continuously, whereby the above recited objects are achieved.

On occasion it is desirable to discharge eggs carried by a multi-flight conveyor onto a second conveyor moving in a direction substantially at right angles to the direction of motion of the first conveyor. If the eggs are close together on the egg supporting flight of the first conveyor, the change in direction of motion of the eggs may cause some of the eggs to collide and check. Furthermore, if all of the eggs on a single flight of the first conveyor are not pushed off the first conveyor simultaneously, then an earlier pushed-off egg may be moved by the receiving or second conveyor under a later pushed-off egg and the resulting collision may cause cracking or checking of the eggs.

Thus, still a further object of this invention is to provide a device for ejecting the eggs carried by a single flight of a multi-flight conveyor, separately and in succession from one end of the flight to the other end of the flight, from said first conveyor onto a second conveyor.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a side elevation view of a pair of adjacent conveyors and of my new egg ejector for discharging the eggs from the first conveyor onto a second conveyor;

Figure 2 is a view taken substantially on line 2—2 of Figure 1;

Figure 3 is a diagrammatic end view similar to Figure 1 showing the two conveyors and the egg ejector in a position intermediate the positions in Figures 4 and 5 with a flight on the first conveyor in driving engagement with the egg ejector;

Figure 4 is a similar to Figure 3 and shows the point where a flight on the first conveyor first engages with the egg ejector;

Figure 5 is similar to Figures 3 and 4 and shows the point where the first conveyor first disengages with the egg ejector and the point where the ejection of eggs rom one flight of the first conveyor is fully achieved;

Figure 6 is an enlarged fragmentary view of the flight and drive chain of the first conveyor;

Figure 7 is a perspective view of the egg ejector;

Figure 8 is a fragmentary elevation view of a pair of conveyors traveling substantially at right angles to each other and showing my new egg ejector for discharging eggs from one flight of the first conveyor onto said second conveyor in such a manner that the eggs are deposited separately and in succession onto said second conveyor;

Figure 9 is a perspective view, similar to Figure 7, of the egg ejector used in the machine shown in Figure 8; and Figure 10 is an enlarged fragmentary view of the crossbar and spider connection of the egg ejector shown in Figure 9.

Referring now to the drawings, there is shown in Figure 1 a first conveyor 10 of the type similar to that shown in my above referred to copending application. This first conveyor 10 includes a pair of spaced drive chains 12 and spaced conveyor flights 14 secured to said drive chains. The drive chains 12 are trained over sprockets 16 which are rotatably mounted on the supporting framework of the first conveyor. The flights 14 have outer portions 17 and inner portions 18 which together form a crotch for supporting the eggs or articles that are carried down a descending portion of the run of the conveyor, as shown in Figure 1, and in the manner clearly set forth in my copending application. The eggs carried by flights 14 are to be ejected from conveyor 10 onto a second conveyor 20 positioned closely adjacent thereto.

The device for achieving the discharge of eggs from the first conveyor 10 to the second conveyor 20 is the egg ejector generally indicated at 22. The eggs that are discharged from the first conveyor 10 are deposited onto a shelf 24 spaced above the second conveyor and down which shelf the eggs roll onto the continuously moving belt 26 of the second conveyor by means of which belt 26 the eggs are conveyed to another station for further processing. Guards 28 are provided at the ends of the shelf 24 to prevent the eggs from rolling off the ends of said shelf.

Referring now in particular to the egg ejector 22, said egg ejector comprises a pair of spiders 30 and 32 each having six arms repectively designated A, B, C, D, E, and F. The arms of the spiders are spaced apart to bound pockets *a*, *b*, *c*, *d*, *e*, and *f*. Each of said arms on the spiders supports a pair of cross-bars 34 and 36. The arms on the spiders are adapted to extend into, or mesh with, the spaces between successive flights 14 on conveyor 10.

Each of the arms on the spider is of a peculiar configuration. The leading edge 38 of each arm, with respect to the direction of rotation of the spider, is recessed radially inwardly at 40. The trailing edge 42 of each arm is bevelled off at 44 in order to achieve clearance between the flights of the conveyor and the spider arms when the spider arms are in a particular position.

The spacing of the arms and the size of the arms are such that the arcuate extent of the arms is substantially no more than one-half of the distance between corresponding points on successive arms. Because there are six arms on the spider, the arc between corresponding points on successive arms is substantially 60°.

The egg ejector 22 is rotatably mounted on the shaft 46, upon which are fixedly mounted the sprockets 16. Thus while the sprockets 16 and the shaft 46 rotate as a unit, the egg ejector 20 is free to rotate with respect to shaft 46. The movement of the egg ejector 20 is achieved by the engagement of various flights 14 with the arms of the spider.

The sprockets 16 over which the conveyor 10 is trained have ten teeth and flights 14 are secured to alternate links of the chain 12. Consequently, five flights of the conveyor 10 pass a fixed point during each full rotation of the sprockets 16. However, there are six arms on the spider, and, therefore, only one flight at a time is in engagement with an arm on the spider. Putting it another way, since there are ten teeth on the sprocket and since there is one conveyor flight 14 for each two teeth on the sprocket 16, the arcuate spacing between successive flights on the conveyor is 72°, while the arcuate spacing between successive points on successive arms of the spider is 60°. When a first flight 14 is in engagement with one of the arms of the spider, the first flight following said engaged flight will be spaced 12° behind the next succeeding arm and the second flight following said engaged flight will be 24° behind the following arm, and so forth.

Each flight is used to rotate the egg ejector 20 a limited amount. Then the flight releases the spider and the conveyor continues its continuous movement until the next flight moves into driving engagement with the arms of the spider and rotates the spider another segmental amount whereupon release again occurs. This procedure continues with the conveyor 10 moving continuously and the egg ejector 20 moving intermittently. The combination of the intermittent movement of the egg ejector with the continuous movement of the conveyor and the particular arrangement of elements is the combination by means of which the successful ejection of eggs takes place.

Considering the condition which exists in Figure 4 when a flight 14*a* first engages arms A on the spiders, at that point the next succeeding flight 14*b* is 12° behind arm B and the second succeeding flight 14*c* is 24° behind arm C. Now as the flight 14*a* moves from the position shown in Figure 4 toward the position of flight 14*f* shown in Figure 4, the eggs carried by flight 14*c* move tangentially with respect to the sprocket 16 while at the same time arm D on the spider is moving arcuately with respect to the tangential path of the conveyor 10. The two paths of movement intersect and the arm D moves across the width of flight 14*c* to reach the position shown in Figure 5 where arm D is effective to discharge the eggs carried by flight 14*c*. At this point shown in Figure 5, the conveyor flight 14*a* has moved out of driving engagement with arms A and flight 14*b* begins to move forwardly until it engages arm B on the spider. When flight 14*b* engages arm B then the position is identical with that shown in Figure 4, and the entire procedure is repeated.

It will be seen that at the time of ejection shown in Figure 5, the arm D is closely adjacent and behind flight 14*c*, but because of the future continuous movement of the conveyor as contrasted with the intermittent movement of the egg ejector, by the time flight 14*c* moves into position to drivingly engage the arms of the spider, that flight will have moved up approximately 24° of arc into engagement with the trailing edge of arm C.

The cross-bars 34 carried by the arms of the spider are successful in ejecting substantially all of the eggs carried by the flight, but in the case where, due to some "crazy" motion of the egg, the egg attempts to move backwards into the conveyor, then the bar 36 is successful in preventing such occurrence.

Because of the fact that the paths of motion of the arms intersect the tangential path of motion of the conveyor 10, the cross-bar 34 sweeps across the width of the conveyor flight 14 and causes all of the eggs, both large and small, to be ejected substantially at the same time and at the same height above shelf 24, thus eliminating the deficiency found in previous egg ejectors.

In the modified form shown in Figure 8, the receiving conveyor 48 is moving substantially at right angles to the direction of movement of the first conveyor 10. To obtain successive continuous discharge of eggs from a single flight, the lateral ends of each flights 14, which extend in the direction of motion of the receiving conveyor 48, are advanced with respect to their other ends by merely rotating sprocket 16' forward on shaft 46 relative to the sprocket 16. By rotating sprocket 16' forward, the conveyor chain 12' is in advance of the other conveyor chain 12, as seen in Figure 8. The spider 32 is also advanced with respect to spider 30 and the ejector 22' appears to be twisted because the arms of the spider must be positioned in the spaces between successive flights 14 on the conveyor as they are driven by the flights of the conveyor. Since the spiders 32 and 30 are not fixed with respect to each other, such twisting is achieved merely because of the driving engagement of the flights 14 with the arms of the ejector 22'. The twisted egg ejector 22' will appear as seen in Figure 9. To accommodate such twisting of the egg ejector the cross-bars 34 and 36 are positioned in oversized holes 37 in the arms of the spiders, as clearly illustrated in Figure 10.

In the operation of the device shown in Figure 8, the discharge of eggs will occur only when any particular portion of the conveyor flights 14 passes a certain height; and, therefore, the eggs will be successively discharged along the length of the conveyor flight, in the manner shown in Figure 8, because successive sections of the flight pass said predetermined height. Since the egg supporting run of conveyor 48 is moving from left to right as shown in Figure 8 and since the eggs are discharged from the righthand end of the conveyor flights first, there is no possibility of later discharged eggs falling onto earlier discharged eggs and, therefore, the possibility of checking is substantially eliminated.

While some of the claims herein may refer therein to the conveying and discharging of eggs, it will be evident that the invention covered by the claims can also be used for conveying and discharging other articles and objects, and so the claims herein are intended to be not limited to any particular object or objects to be used with the invention defined in the claims.

While there has been shown and described a particular embodiment of this invention, it will be obvious to those skilled in the art that various changes and modifications may be made therein without departing from the invention, and, therefore, it is intended in the appended claims to cover all such changes and modifications as fall within the true spirit and scope of the invention.

What I claim as new, and desire to secure by Letters Patent of the United States, is:

1. In combination, a continuously moving conveyor having a plurality of spaced flights for conveying eggs, said conveyor having a portion of its run first passing a discharge station and thereafter trained about a horizontal axis, an ejector mounted to rotate on said horizontal axis, said ejector being intermittently moved by intermittent contact with said continuously moving conveyor and operable to discharge the eggs from said conveyor, said ejector having a plurality of arms adapted to extend into the spaces between pairs of adjacent conveyor flights, and said arms being spaced so as to be singly engaged by the moving conveyor flights.

2. In combination, a continuously moving conveyor having a plurality of spaced flights for conveying eggs, said conveyor having a portion of its run first passing a discharge station and thereafter trained about a horizontal axis, an ejector mounted to rotate on said horizontal axis, said ejector being intermittently moved by said continuously moving conveyor, said ejector having a plurality of arms adapted to extend into the spaces between pairs of adjacent conveyor flights, said arms being spaced so as to be singly engaged by the moving conveyor flights, and cross-rods carried by said arms operative to effect discharge of the eggs from the conveyor.

3. A device for discharging articles from a multi-flight conveyor wherein the conveyor flights are parallel and extend transverse to the direction of motion of the conveyor and adjacent flights are spaced apart a distance large enough to accommodate only one said article therebetween; said device comprising a pair of rotatably mounted, similar multi-armed spiders, the arms of each of said spiders adapted to extend into the spaces between said flights and adapted to be singly engaged by the moving conveyor flights, a plurality of cross-rods extending substantially parallel to the flights and connected at their ends to said spiders, each arm of each spider having at least one cross-rod connected thereto, and the spacing between similar points on successive arms being less than the spacing between similar points on successive flights, whereby when a plurality of arms are positioned between flights only one arm is engaged at any one time by one of said flights.

4. In combination, a continuously moving conveyor having a plurality of spaced flights for conveying eggs, said conveyor having a portion of its run first passing a discharge station and thereafter trained about a horizontal axis, an ejector mounted to rotate on said horizontal axis, said ejector being intermittently moved by said continuously moving conveyor, said ejector having a plurality of arms adapted to extend into the spaces between pairs of adjacent conveyor flights, said arms being spaced so as to be singly engaged by the moving conveyor flights, a pair of arcuately spaced cross-rods carried by each arm of the spider, the forwardmost cross-rod being operative to effect discharge of the eggs from the conveyor, and the other cross-rod being operative to prevent eggs rolling back into the conveyor.

5. A device for discharging articles from a multi-flight conveyor wherein the conveyor flights are parallel and extend transverse to the direction of motion of the conveyor and adjacent flights are spaced apart a distance large enough to accommodate only one said article therebetween; said device comprising a pair of rotatably mounted, similar multi-armed spiders, a plurality of the arms of each of said spiders adapted to extend into the spaces between said flights and adapted to be engaged by the moving conveyor flights, a plurality of cross-rods extending substantially parallel to the flights and connected at their ends to said spiders, each arm of each spider having at least one cross-rod connected thereto, the spacing between similar points on successive arms being less than the spacing between similar points on successive flights, whereby when a plurality of arms are positioned between flights only one arm is engaged at any one time by one of said flights, the cross-rods secured to the arms following one of said flights being operative to discharge the articles positioned behind said one flight, said one flight being operative thereafter to engage the arms forward of said flight to rotate the spiders, whereby arms and cross-rods following therebehind are operative to discharge articles from following flights.

6. A device as set forth in claim 5, wherein the portion of the arc through which the spider is rotated by engagement of a single conveyor flight is $360°/n$, wherein $n$ is the number of arms on the spider, the arms of the spiders and the flights being shaped to afford disengagement thereof immediately after said period of driving engagement between said flight and said arms, and the next following flight thereafter moving forwardly relative to the spiders into driving engagement with the arms positioned forwardly thereof.

7. A device as set forth in claim 5, wherein the flight forward of the space from which the articles are being discharged is the second flight following the flight which is in driving engagement with the arms of the spider.

8. In combination, a multi-flight conveyor having a plurality of parallel flights which extend transverse to the direction of movement of the conveyor, said flights being spaced apart a distance large enough to accommodate only one row of eggs therebetween, a portion of the run of said conveyor descending past a station at which eggs are adapted to be discharged from the conveyor, a portion of the conveyor which has passed the discharge station being trained around a substantially horizontal axis and continuing its run substantially horizontally, and an ejector for discharging the eggs carried by said conveyor at said discharge station, said ejector comprising a plurality of similar multi-armed spiders mounted to rotate on said horizontal axis, the arms of said spiders adapted to extend into the spaces between said flights and spaced so as to be singly engaged by the moving conveyor flights, and a plurality of cross-rods extending parallel to the flights and supported by said spiders adapted to move the eggs between the flights outwardly therefrom to effect the discharge of said eggs from the conveyor.

9. A combination as set forth in claim 8, wherein the conveyor and the spider are arranged so that the flight forward of the space into which an arm of the spider is first entering moves tangentially into the pocket forward of said arm, and said arm simultaneously moves arcuately into said space behind said flight, whereby the rod carried by said arm is moved across substantially the width of said flight closely adjacent thereto and operates to discharge from the conveyor the eggs positioned in said space behind said flight.

10. A combination as set forth in claim 8, wherein the leading edge of each arm is recessed at a region radially inwardly of the outer extent of the arm to afford clearance for the conveyor flights.

11. A combination as set forth in claim 8 wherein said spiders form alternate arms and pockets, the radial depth of the pockets being sufficient to accommodate the conveyor flights, the arcuate spacing of conveyor flights trained around said axis of rotation being greater than the arcuate spacing between similar points on successive arms of the spider, and the arcuate width of said arms being no greater than one-half the arcuate spacing between similar points on successive arms.

12. A combination as set forth in claim 8 wherein said spiders have six arms with six pockets therebetween, the arcuate spacing of the flights trained around the axis of rotation of the spiders being substantially 72°, the arms of the spiders being of an arcuate width no more than one-half the arcuate spacing between similar points on successive arms, and the flight forward of the space from which the articles are being discharged being the second flight following the flight which is in driving engagement with the arms of the spider.

13. In combination, a continuously moving multi-flight conveyor for carrying eggs therealong in spaced rows each including a plurality of eggs and said rows extending transverse to the direction of motion of said conveyor, a second conveyor moving in a direction transverse to the direction of movement of said multi-flight conveyor and adapted to receive eggs discharged from said multi-flight conveyor, and an ejector positioned in skewed relation to said second conveyor for discharging the plurality of eggs in each row successively, one after another, along the length of the row onto said second conveyor while said first mentioned conveyor is moving.

14. In combination, a continuously moving multi-flight conveyor for carrying eggs therealong in spaced rows extending transverse to the direction of motion of said conveyor, the flights of said multi-flight conveyor being skewed with respect to a surface positioned to receive eggs discharged from said conveyor, whereby successive portions along the length of each flight successively pass said surface, and an ejector for discharging the eggs in each row successively along the length of the row onto said surface adapted to receive the eggs.

15. In combination, a continuously moving multi-flight conveyor for carrying eggs therealong spaced in rows between pairs of flights of the conveyor, said rows of eggs extending transverse to the direction of motion of said conveyor, said conveyor flights being skewed with respect to a surface positioned to receive eggs discharged from the conveyor, whereby successive portions along the length of each flight successively pass said surface, and an ejector for discharging the eggs in each row successively along the length of the row onto said surface adapted to receive the eggs, said ejector comprising a plurality of spiders each having arms adapted to enter between pairs of flights of the conveyor, and cross-rods carried by said spider arms adapted to engage and discharge the eggs from the conveyor.

16. In combination, a continuously moving multi-flight conveyor for carrying eggs therealong spaced in rows between pairs of flights of the conveyor, said rows of eggs extending transverse to the direction of motion of said conveyor, said conveyor flights being skewed with respect to a surface positioned to receive eggs discharged from the conveyor, whereby successive portions along the length of each flight successively pass said surface, and an ejector for discharging the eggs in each row successively along the length of the row onto said surface adapted to receive the eggs, said ejector comprising a plurality of spiders each having arms adapted to enter between pairs of flights of the conveyor, cross-rods carried by said spider arms adapted to engage and discharge the eggs from the conveyor, said cross-rods being loosely mounted on the spider to afford a range of skewing angles for said rods.

17. In combination, a continuously moving multi-flight conveyor for carrying eggs therealong in spaced rows between pairs of flights of the conveyor, said rows of eggs extending transverse to the direction of motion of said conveyor, said conveyor flights being skewed with respect to a surface positioned to receive eggs discharged from the conveyor, whereby successive portions along the length of each flight successively pass said surface, an ejector for discharging the eggs in each row successively along the length of the row onto said surface adapted to receive the eggs, said ejector comprising a plurality of spiders each having arms adapted to enter between pairs of flights of the conveyor, said ejector being skewed to conform with the skewing of conveyor flights, and the spacing between the arms of the spider and between the flights of the conveyor being such that when a plurality of arms on a spider are positioned between conveyor flights only one arm is engaged at any one time by a conveyor flight.

18. In combination, a continuously moving multi-flight conveyor for carrying eggs therealong in spaced rows extending transverse to the direction of motion of said conveyor, the flights of said multi-flight conveyor being skewed with respect to a surface positioned to receive eggs discharged from said conveyor, whereby successive portions along the length of each flight successively pass said surface, and an ejector for discharging the eggs in each row successively along the length of the row onto said surface adapted to receive the eggs, said ejector being intermittently moved by said continuously moving conveyor.

19. In combination, a continuous moving conveyor for carrying objects therealong in spaced rows which extend transverse to the direction of motion of said conveyor, each said row having a plurality of objects positioned therein, a second conveyor movable in a direction transverse to the direction of movement of said first conveyor and adapted to receive the objects discharged from said first conveyor, and an ejector positioned in skewed relation to said second conveyor and being operatively associated with said first conveyor for discharging the objects carried by said first conveyor onto said second conveyor while said first conveyor is moving, said ejector being operative to discharge the plurality of objects in each spaced row successively, one after another, along the length of the row.

References Cited in the file of this patent

UNITED STATES PATENTS

| | | |
|---|---|---|
| 1,092,609 | Taliaferro | Apr. 7, 1914 |
| 1,550,365 | Jones | Aug. 18, 1925 |
| 2,124,423 | Ladewig et al. | July 19, 1938 |
| 2,462,276 | Mueller | Feb. 22, 1949 |
| 2,620,608 | Smith | Dec. 9, 1952 |